Feb. 6, 1968     R. H. ROBERTS ET AL     3,368,143
TIMING ADVANCE MEASURING APPARATUS
Filed April 29, 1965
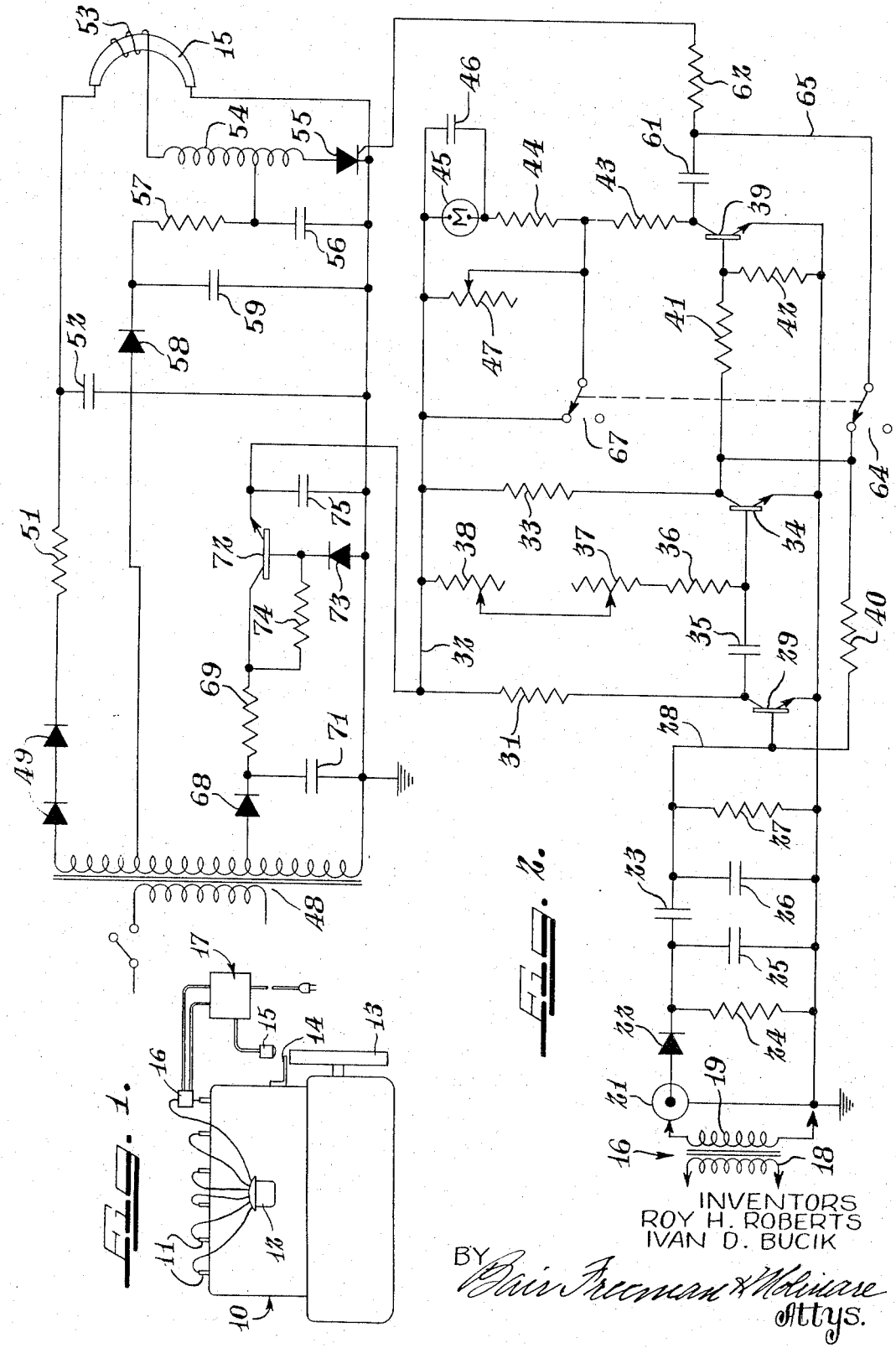
INVENTORS
ROY H. ROBERTS
IVAN D. BUCIK
BY
Attys.

United States Patent Office 3,368,143
Patented Feb. 6, 1968

3,368,143
TIMING ADVANCE MEASURING APPARATUS
Roy H. Roberts, Glenview, and Ivan D. Bucik, Chicago, Ill., assignors to Sun Electric Corporation, a corporation of Delaware
Filed Apr. 29, 1965, Ser. No. 451,752
2 Claims. (Cl. 324—16)

ABSTRACT OF THE DISCLOSURE

Timing advance measuring apparatus for an engine having a spark plug comprising a flashing lamp to illuminate a reference mark on the engine, a control circuit for energizing the lamp, including a flip-flop circuit and an amplifier circuit, and test means including a by-pass switch connected so as to shunt the flip-flop and amplifier circuits for supplying a signal from the spark plug to the lamp switching device.

This invention relates to timing advance measuring apparatus and more particularly to electronic means for accurately measuring the amount by which the spark plug in an internal combustion engine fires in advance of the normal idling or top dead center position.

An apparatus has been heretofore proposed for measuring the degree of ignition advanced in an internal combustion engine by illuminating a reference mark on the engine by a flashing lamp and adjustably varying the time of flashing of the lamp after firing of the engine spark plug to show an indication for the normal idling firing or top dead center position of the piston in the normal idling position. Such apparatus is disclosed for example in the patent to Wells et al., No. 2,715,711.

The present invention relates to the improved apparatus of this general type and has for one of its objects the providing of timing advance measuring apparatus which is relatively simple and extremely compact and which provides maximum reliability and accuracy.

Another object of the invention is to provide a timing advance measuring apparatus including a flip-flop or mono-stable multivibrator which is adjustable to vary the time interval and in which the meter for measuring current flow and thereby indicating the timing advance is separate from the flip-flop circuit so as not to interfere with the sensitivity thereof.

According to a feature of the invention, the flip-flop circuit controls an amplifier stage and the meter is connected to measure the flow of current in the amplifier stage. This results in more sensitivity and accuracy of adjustment of the timing interval and is an extremely accurate indication of the timing advance by the meter.

A further object is to provide a timing advance measuring apparatus in which all components are solid state devices, thereby providing an extremely compact and highly reliable unit.

The above and other objects and advantages of the invention will be more readily apparent from the following description, when read in connection with the accompanying drawing, in which:

FIG. 1 is a generally diagrammatic view illustrating the use of the apparatus in an internal combustion engine; and FIG. 2 is a circuit diagram of the apparatus.

As shown in FIG. 1, the invention may be used in any conventional internal combustion engine indicated generally at 10, which is provided with a plurality of spark plugs 11 whose firing is sequentially controlled by a distributor 12. The engine is provided with a rotating part 13, such as the usual fly wheel, which is provided with a reference mark thereon and with a fixed reference such as a pointer 14 carried by a fixed part of the engine to indicate when one of the pistons, as for example the number one piston, is at its top dead center position.

The engine may be equipped with the usual automatic timing advance which will cause the spark plugs to fire at varying times in advance of the top dead center positions of the cylinders, and the purpose of the invention is to determine accurately the amount of this advance. For this purpose a flasher lamp 15 is provided which is periodically fired upon firing of one of the spark plugs, and whose time of firing after triggering by the spark plug may be delayed thereby to produce an indication of the degree of advance ahead of the top dead center position of the piston. For this purpose a pick-up device 16 which may be a transformer coil or the like is connected in one of the leads between the distributor and one of the spark plugs, such as that for the number one engine cylinder. When the spark plug fires a signal will be transmitted from the pick-up 16 to an instrument indicated generally at 17 which controls firing of the lamp 15 and which is adjustable to create a time delay between triggering by the firing of the spark plug and firing of the lamp.

The instrument 17 may be constructed as shown in the circuit diagram, FIG. 2. As there illustrated, the pick-up 16 comprises a transformer whose primary winding 18 may be connected in series in the lead from the distributor to the spark plug and whose secondary winding 19 provides a signal for triggering the instrument, 17. As shown, the secondary winding 19 of the transformer is connected through a jack 21 to ground and to one side of a pulse shaper circuit. As shown, the pulse shaper circuit includes a rectifier 22 and a capacitor 23 connected in series, a resistor 24 and a capacitor 25 are connected in parallel between ground and the common point between rectifier 22 and capacitor 23. Beyond the capacitor 23 an additional capacitor 26 and resistor 27 are connected in shunt to ground with the output of the circuit being transmitted as a shaped pulse through a line 28.

The line 28 is connected to the base of transistor 29 whose emitter is connected to ground and whose collector is connected through a resistor 31 to a line 32. The line 32, as described more fully hereinafter, constitutes a potentiometer supply for the circuit. The line 32 is also connected through a resistor 33 to the collector of a second transistor 34 whose emitter is connected to ground. The collector on transistor 29 is connected through a capacitor 35 to the base of the transistor 34 and the common point between the capacitor 35 and the base of transistor 34 is connected through a fixed resistor 36 and a pair of adjustable potentiometers 37 and 38 to the line 32. The resistor 38 may have a relatively high value such as 24K to adjust the timing delay while the resistor 37 has a lower value on the order of 500 ohms to calibrate the circuit. The collector on transistor 34 is also connected through a resistor 40 with the base of transistor 29 to hold the transistor 29 non-conducting when the transistor 34 is conducting.

It will be seen that with the circuit as so far described, the transistors 29 and 24 and their associated circuit elements constitute a flip-flop circuit or mono-stable vibrator. The transistor 34 is normally conducting due to the positive voltage applied to its base through the potentiometers 37 and 38 and resistor 36, while the transistor 29 is normally non-conducting. When the transistor 29 is triggered into conduction, a negative pulse will be transmitted to the base of the transistor 34 through the capacitor 35 to trigger it into non-conduction and this condition will persist until the charge of capacitor 35 has been dissipated. This charge will leak off through the resistor 36 and the potentiometers 37 and 38 which can be adjusted to vary the time interval. When the charge of capacitor 35 has leaked off the transistor 34 will again become conductive and transistor 29 will again become non-conductive.

When the transistor 34 is conducting in the normal condition of the circuit a negative bias will be applied to the base of an amplifier transistor 39 through resistor 41 and also through a relative high value resistor 42 connecting the base of transistor 39 to ground. Transistor 39 will therefore normally be non-conducting. When the transistor 34 is triggered to non-conduction a positive pulse will be supplied through resistor 41 to the base of transistor 39 and it will be triggered into conduction and will remain conductive until transistor 34 again conducts. The collector of transistor 39 is connected through series resistors 43 and 44 to a meter 45 with which a capacitor 46 is in parallel to dampen out fluctuations to the potentiometer supply line 32. Preferably a calibrating potentiometer 47 is also connected in parallel with resistor 44 and meter 45 to calibrate the meter. When the transistor 39 is conducting, current will flow through the meter which will indicate the time during which the transistor 39 conducts and thereby indicating the time delay between triggering of the flip-flop circuit by supplying a signal from line 28 to the base of transistor 29 until the circuit returns to its normal position. The meter therefore will accurately indicate the time delay produced by the flip-flop circuit.

The flip-flop and amplifier circuit as described and the lamp 15 are energized from a transformer 48 whose primary may be connected to any associated sources of voltage such as the usual 115 voltage outlet. One side of the secondary winding of transistor 48 is grounded as shown and the other side is connected through a pair of rectifiers 49 and a series load resistor 51 to one side of the lamp 15. The other side of the lamp 15 is connected to ground as shown. A capacitor 52 is connected in parallel with the lamp and will be charged when the lamp is non-conducting and will discharge through the lamp when it is triggered into conduction to provide a flash of relatively short duration.

The lamp 15 is triggered by a triggering winding 53 which is powered through an auto transformer 54 connected through a silicon controlled rectifier 55 to ground. A tap in the auto transformer winding 54 is connected to the common point between a capacitor 56 and a resistor 57. The other side of capacitor 56 is connected to ground and the other side of the resistor 57 is connected through a rectifier 58 to a tap on the secondary of transformer 48. A filter condenser 59 is preferably connected in shunt with the resistor 57 and capacitor 56. With this circuit the silicon controlled rectifier 55 is normally non-conducting, but when it is triggered into conduction the transformer 54 will supply a triggering pulse to the starting or triggering winding 53 of the lamp 15 to cause it to flash.

The trigger signal for the silicon controlled rectifier 55 is normally supplied from the collector of the transistor 39 through a capacitor 61 and resistor 62 in series. When the transistor 39 is triggered into conduction, its collector becomes more negative and tends to produce a negative pulse which is transmitted to the control electrode of the silicon rectifier 55 to maintain it non-conductive. However, when the transistor 39 again becomes non-conductive, a positive pulse will be transmitted to the control electrode of the silicon controlled rectifier 55 to trigger it into conduction and thereby to cause the lamp 15 to fire.

For testing the circuit, the line 28 may be connected through the resistor 40 and one contact of a selector switch 64 and a line 65 to a point between the capacitor 61 and resistor 62. The switch 64 is coupled to a switch 67 which connects the common point between the resistors 43 and 44 directly to the power line 32 to shunt the meter 45.

With switches 64 and 67 closed as shown, whenever a pulse is produced in the line 28 by firing of the spark plug of the number one cylinder, this pulse will be transmitted directly to the control electrode of the silicon controlled rectifier 55 to cause it to fire and thereby to cause the lamp to flash. With the engine in idling condition so that the spark plug fires at top dead center position, this will provide a check not only of idling firing condition of the engine, but also of operation of the circuit. For normal testing operation, the switches 64 and 67 are open and the circuit will function as described above.

The power supply for the flip-flop and amplifier circuits is preferably taken from the secondary winding of transformer 48 as shown. For this purpose a tap on the transformer secondary is connected through a rectifier 68 and through a filter circuit including a series resistor 69 and a shunt capacitor 71 to the collector of transistor 72. The base of the transistor 72 is connected through a rectifier 73 to ground and through resistor 74 to its collector. The emitter of the transformer 72 is connected to the line 32 with a shunt capacitor 75 connected between the emitter and ground for filtering. This circuit will provide an accurate source of voltage for accurate meter indications.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. Timing advance measuring apparatus for an engine having a spark plug and provided with indicia to indicate the normal firing position for the spark plug at idling speed, said apparatus comprising a lamp to illuminate said indicia, a circuit for energizing the lamp including a switching device, and a control circuit for the switching device including a flip-flop circuit, connections to the flip-flop circuit normally biasing it to one condition, a connection from the spark plug to the flip-flop circuit to trigger it to its reverse condition when the spark plug fires, adjustable time delay means in the flip-flop circuit to return it to said one condition after a time interval, a normally non-conductive amplifier circuit, means to trigger the amplifier circuit into conduction simultaneously with triggering of the flip-flop circuit to its reverse condition and to return the amplifier circuit to non-conducting condition when the flip-flop circuit returns to its said one condition, a meter to measure current flow in the amplifier circuit when it is conducting, a connection from the amplifier circuit to the switching device to trigger the switching device into conduction when the amplifier circuit returns to non-conducting condition and a first by-pass switch connected between said connection from the spark plug and said switching device so as to shunt the flip-flop and amplifier circuits and effective when closed to supply a signal from the spark plug to the switching device to trigger it into conduction when the spark plug fires, thereby permitting testing of the circuit to be effected.

2. The apparatus of claim 1 including a second by-pass switch operable simultaneously with said first by-pass switch to shunt the meter when said second by-pass switch is closed.

References Cited

UNITED STATES PATENTS

| | | | |
|---|---|---|---|
| 2,715,711 | 9/1955 | Wells | 324—16 |
| 2,785,215 | 3/1957 | Yetter | 324—16 |
| 2,817,058 | 12/1957 | Weidner | 315—241 |
| 2,908,859 | 10/1959 | Moehring | 324—16 |

RUDOLPH V. ROLINEC, *Primary Examiner.*

M. J. LYNCH, *Assistant Examiner.*